(12) United States Patent
Khoun et al.

(10) Patent No.: US 11,156,098 B2
(45) Date of Patent: Oct. 26, 2021

(54) MATE FACE ARRANGEMENT FOR GAS TURBINE ENGINE COMPONENTS

(71) Applicant: United Technologies Corporation, Farmington, CT (US)

(72) Inventors: Laengheng Khoun, Hartford, CT (US); Edward F. Pietraszkiewicz, Southington, CT (US); David J. Hiskes, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 317 days.

(21) Appl. No.: 16/269,793

(22) Filed: Feb. 7, 2019

(65) Prior Publication Data

US 2020/0256195 A1    Aug. 13, 2020

(51) Int. Cl.
*F01D 5/14* (2006.01)
*F01D 9/04* (2006.01)
(Continued)

(52) U.S. Cl.
CPC ............ *F01D 5/143* (2013.01); *F01D 9/041* (2013.01); *F01D 11/006* (2013.01); *F01D 11/08* (2013.01);
(Continued)

(58) Field of Classification Search
CPC ........ F01D 5/143; F01D 9/041; F01D 11/005; F01D 11/006; F01D 11/08; F01D 11/008;
(Continued)

(56) References Cited

U.S. PATENT DOCUMENTS 7,195,454 B2 * 3/2007 Lu .................. F01D 25/246
415/181
2012/0219405 A1 * 8/2012 Szwedowicz ........ F16J 15/0887
415/173.3

(Continued)

FOREIGN PATENT DOCUMENTS

| EP | 3075954 | 10/2016 |
|---|---|---|
| WO | 2014209464 | 12/2014 |
| WO | 2018004583 | 1/2018 |

OTHER PUBLICATIONS

Bohn, D.E., Kusterer, K., Surken, N., and Kreitmeler, F. (2000). Influence of endwall contouring in axial gaps on the flow field in a four-stage turbine. ASME Turboexpo 2000. Munich, Germany. May 8-11, 2000. pp. 2-8.
(Continued)

*Primary Examiner* — Courtney D Heinle
*Assistant Examiner* — Sang K Kim
(74) *Attorney, Agent, or Firm* — Carlson, Gaskey & Olds, P.C.

(57) ABSTRACT

A component for a gas turbine engine according to an example of the present disclosure includes, among other things, an airfoil section extending in a radial direction from a platform, the airfoil section extending in an axial direction between an airfoil leading edge and an airfoil trailing edge, and the airfoil section extending in the circumferential direction between pressure and suction sides. The platform extends in the axial direction between a platform leading edge and a platform trailing edge, and extends in the circumferential direction between a first mate face and a second mate face. The platform has a radially facing surface joined with the airfoil section and has a cold side surface opposed to the radially facing surface. A first thickness is defined between the radially facing surface and the cold side surface adjacent the first mate face, and a second thickness
(Continued)

is defined between the radially facing surface and the cold side surface adjacent the second mate face. The first thickness is greater than the second thickness from at least the airfoil leading edge to the airfoil trailing edge with respect to the axial direction. A method of assembly is also disclosed.

20 Claims, 7 Drawing Sheets

(51) Int. Cl.
  *F01D 11/00* (2006.01)
  *F01D 11/08* (2006.01)
(52) U.S. Cl.
  CPC ...... *F05D 2220/32* (2013.01); *F05D 2240/11* (2013.01); *F05D 2240/55* (2013.01); *F05D 2250/192* (2013.01)
(58) Field of Classification Search
  CPC ............. F05D 2220/32; F05D 2240/11; F05D 2240/55; F05D 2250/192
  See application file for complete search history.

(56) References Cited

U.S. PATENT DOCUMENTS

| | | |
|---|---|---|
| 2013/0315745 A1 | 11/2013 | Aggarwala |
| 2016/0053621 A1* | 2/2016 | Vu .......................... F01D 5/143 |
| | | 415/209.3 |
| 2016/0146031 A1 | 5/2016 | Ahmad et al. |
| 2016/0258294 A1* | 9/2016 | Weinert .................... F01D 5/10 |
| 2017/0022839 A1* | 1/2017 | Lewis ..................... F01D 11/08 |
| 2019/0368050 A1* | 12/2019 | Wells ..................... C23C 28/321 |
| 2019/0383393 A1* | 12/2019 | Sarawate .............. F01D 11/005 |

OTHER PUBLICATIONS

Acharya, S. (2007). Endwall cooling with endwall contouring and leading edge fillet. Final Report. Turbine Innovation and Energy Research Center. Mar. 2007. pp. 1-84.

Timko, L.P. (1984). Energy efficient engine high pressure turbine component test performance report. Technical Report prepare for NASA CR-1682989. Jan. 1, 1984. pp. 1-180.

European Search Report for European Patent Application No. 20155943.2 completed May 27, 2020.

* cited by examiner

MATE FACE ARRANGEMENT FOR GAS TURBINE ENGINE COMPONENTS

BACKGROUND

This disclosure relates to components of a gas turbine engine, including mate face arrangements of adjacent components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The turbine section may include one or more stages of rotatable blades and static vanes. The vanes may be arranged in an array with mate faces of adjacent vanes placed in close proximity. The vanes are exposed to relatively hot gases in the gas flow path.

SUMMARY

A component for a gas turbine engine according to an example of the present disclosure includes an airfoil section extending in a radial direction from a platform, the airfoil section extending in an axial direction between an airfoil leading edge and an airfoil trailing edge, and the airfoil section extending in the circumferential direction between pressure and suction sides. The platform extends in the axial direction between a platform leading edge and a platform trailing edge, and extends in the circumferential direction between a first mate face and a second mate face. The platform has a radially facing surface joined with the airfoil section and has a cold side surface opposed to the radially facing surface. A first thickness is defined between the radially facing surface and the cold side surface adjacent the first mate face, and a second thickness is defined between the radially facing surface and the cold side surface adjacent the second mate face. The first thickness is greater than the second thickness from at least the airfoil leading edge to the airfoil trailing edge with respect to the axial direction.

In a further embodiment of any of the foregoing embodiments, the first thickness is greater than second thickness from the platform leading edge to the platform trailing edge.

In a further embodiment of any of the foregoing embodiments, the first mate face is adjacent the suction side, and the second mate face is adjacent the pressure side.

In a further embodiment of any of the foregoing embodiments, the platform includes a contour that slopes inwardly from the radially facing surface toward the second mate face.

In a further embodiment of any of the foregoing embodiments, the contour extends in the axial direction from the platform leading edge to the platform trailing edge.

A further embodiment of any of the foregoing embodiments includes at least one coating disposed along the radially facing surface and the contour.

In a further embodiment of any of the foregoing embodiments, the first mate face defines a first retention slot, the second mate face defines a second retention slot, and each of the first and second retention slots is dimensioned to receive a respective seal member.

In a further embodiment of any of the foregoing embodiments, a first distance is defined in the radial direction between the radially facing surface and the first retention slot adjacent the first mate face, a second distance is defined between the radially facing surface and the second retention slot adjacent the second mate face, and the first distance is greater than second distance.

In a further embodiment of any of the foregoing embodiments, the component is a turbine vane, and the airfoil section extends between the platform and another platform.

A gas turbine engine according to an example of the present disclosure includes first and second components distributed about an engine longitudinal axis. The first component includes a first endwall extending in an axial direction between a first leading edge and a first trailing edge and extending in a circumferential direction from a first mate face. The first endwall has a first radially facing surface bounding a gas path. The second component has a second endwall extending in the axial direction between a second leading edge and a second trailing edge and extending in the circumferential direction from a second mate face. The second endwall has a second radially facing surface bounding the gas path, and the first and second mate faces opposed to define an intersegment gap. A seal member spans between the first and second mate faces along the intersegment gap. The first component is moveable between first and second installed positions relative to the second component. The first and second radially facing surfaces are radially misaligned in the first position, and the first and second radially facing surfaces are radially aligned in the second position in response to pivoting of the first component in the circumferential direction about the engine longitudinal axis.

In a further embodiment of any of the foregoing embodiments, the first radially facing surface is radially outward of the second radially facing surface when in the first position.

In a further embodiment of any of the foregoing embodiments, the first and second components are first and second vanes. The first vane has a first airfoil section extending in the radial direction from the first endwall, and the second vane has a second airfoil section extending in the radial direction from the second endwall.

In a further embodiment of any of the foregoing embodiments, the first and second airfoil sections extend in the circumferential direction between respective pressure and suction sides. The first mate face is adjacent the respective suction side, and the second mate face is adjacent the respective pressure side.

In a further embodiment of any of the foregoing embodiments, the seal member is a feather seal received in opposed retention slots defined in the first and second mate faces, and the first and second radially facing surfaces are radially aligned in the second position such that the feather seal is tilted in the circumferential direction.

In a further embodiment of any of the foregoing embodiments, the feather seal includes a seal face oriented towards the gas path to define an acute angle with the first mate face when in the second position.

In a further embodiment of any of the foregoing embodiments, a first thickness is defined between the first radially facing surface and a first cold side surface of the first endwall adjacent the first mate face, a second thickness is defined between the second radially facing surface and a second cold side surface of the second endwall adjacent the second mate face, and the first thickness is greater than the second thickness for at least a majority of a length between the first leading edge and the first trailing edge.

In a further embodiment of any of the foregoing embodiments, the first endwall defines a contour that slopes inwardly from the first radially facing surface toward the first mate face. The contour extends in the axial direction from the first leading edge to the first trailing edge.

A method of assembly for a gas turbine engine according to an example of the present disclosure includes positioning a feather seal across a leakage gap defined between a first mate face of a first component and a second mate face of a second component adjacent the first mate face. The first component has a first radially facing surface extending from the first mate face, and the second component has a second radially facing surface extending from the second mate face. The first component moves between first and second installed positions relative to the second component. The first and second radially facing surfaces are radially misaligned in the first position, and the first and second radially facing surfaces are radially aligned in the second position in response to pivoting of the first component in a circumferential direction.

In a further embodiment of any of the foregoing embodiments, a first thickness is defined between the first radially facing surface and a first cold side surface of the first component adjacent the first mate face, a second thickness is defined between the second radially facing surface and a second cold side surface of the second component adjacent the second mate face, and the first thickness is greater than second thickness.

In a further embodiment of any of the foregoing embodiments, the first and second components are first and second vanes. The first vane has a first airfoil section extending from the first radially facing surface, and the second vane has a second airfoil section extending from the second radially facing surface.

The various features and advantages of this disclosure will become apparent to those skilled in the art from the following detailed description. The drawings that accompany the detailed description can be briefly described as follows.

DETAILED DESCRIPTION

Figure 1:
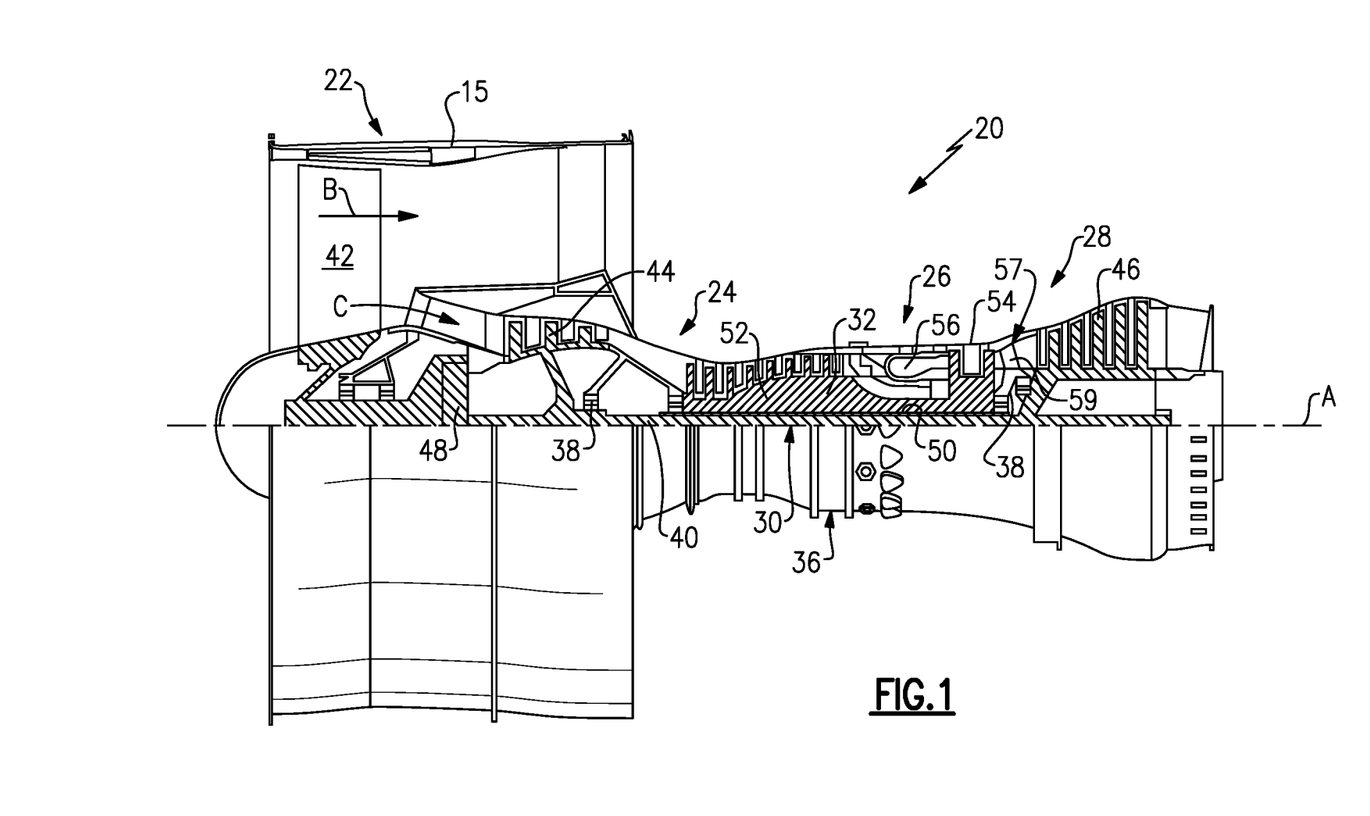
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
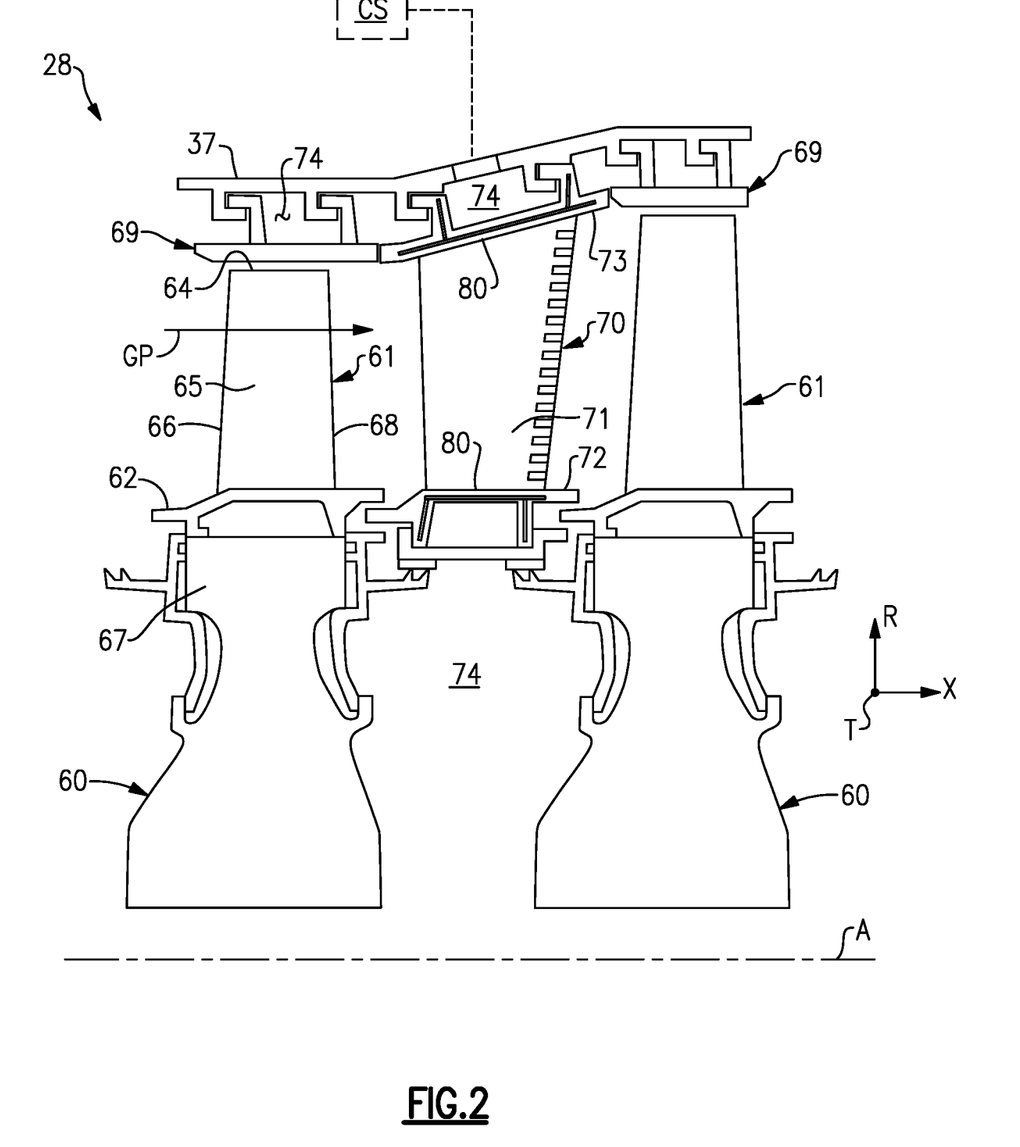
FIG. 2 shows an airfoil arrangement for a turbine section.

FIG. 2 shows selected portions of the turbine section 28 including a rotor 60 carrying one or more blades or airfoils 61. The rotor 60 is rotatable about the engine axis A. Each airfoil 61 includes an airfoil platform 62 and an airfoil section 65 extending in a radial direction R from the airfoil platform 62 to a tip 64. The airfoil section 65 generally extends in a chordwise or axial direction X between an airfoil leading edge 66 and an airfoil trailing edge 68. A root section 67 of the airfoil 61 is mounted to, or integrally formed with, the rotor 60. A blade outer air seal (BOAS) 69 is spaced radially outward from the tip 64 of the airfoil section 65. An array of the BOAS 69 are distributed about an array of the airfoils 61 to bound a gas path GP, such as the core flow path C of FIG. 1.

A vane 70 is positioned along the engine axis A and adjacent to the airfoil 61. The vane 70 includes an airfoil section 71 extending between an inner platform 72 and an outer platform 73 to define a portion of the gas path GP. The turbine section 28 includes an array of airfoils 61, vanes 70, and BOAS 69 arranged circumferentially about the engine axis A.

One or more cooling sources CS (one shown) are configured to provide cooling air to one or more cooling cavities or plenums 74 defined by the engine static structure 36 such as engine case 37 (FIG. 1). In the illustrated example of FIG. 2, the plenums 74 are defined between an engine case 37 and the outer platform 73 and/or BOAS 69. The plenums 74 are configured to receive pressurized cooling flow from the cooling source(s) CS to cool portions of the airfoil 61, BOAS 69 and/or vane 70. Cooling sources CS can include bleed air from an upstream stage of the compressor section 24 (FIG. 1), bypass air, or a secondary cooling system aboard the aircraft, for example.

Figure 3:
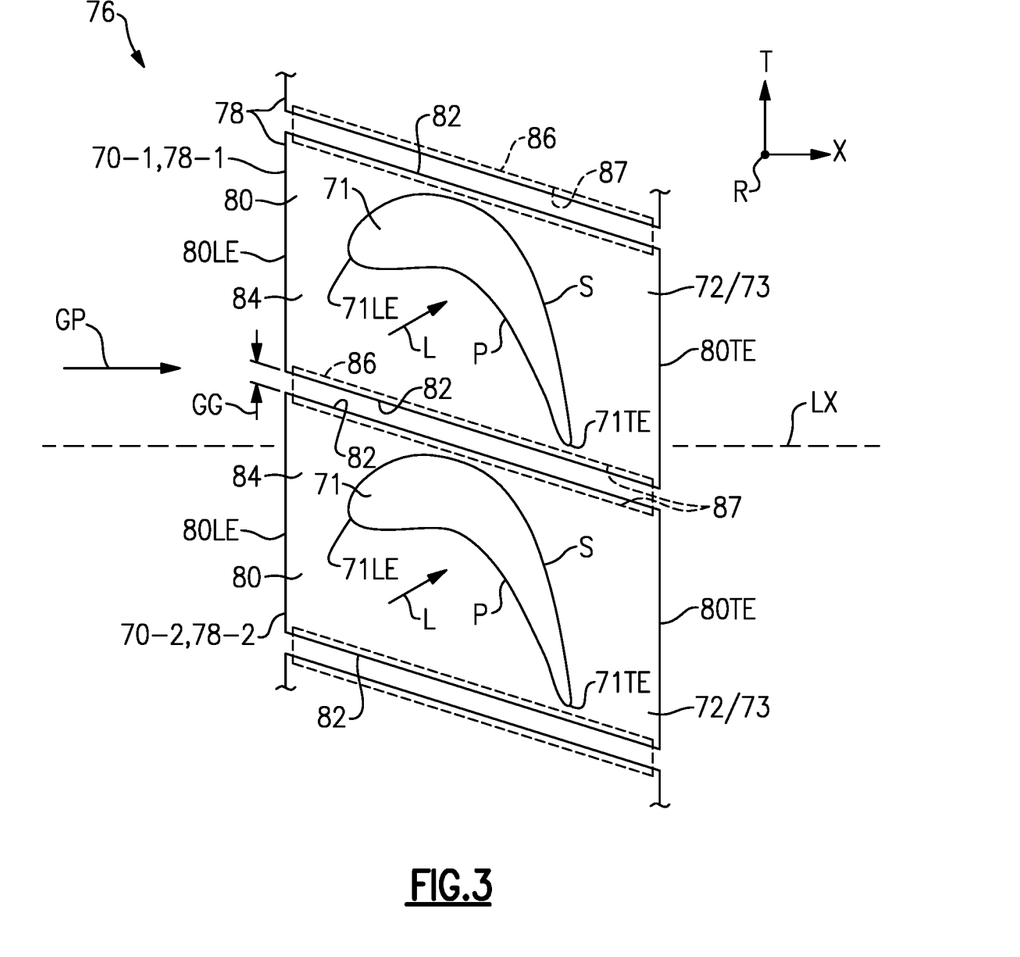
FIG. 3 illustrates a radial view of adjacent components of an assembly.
Figure 4:
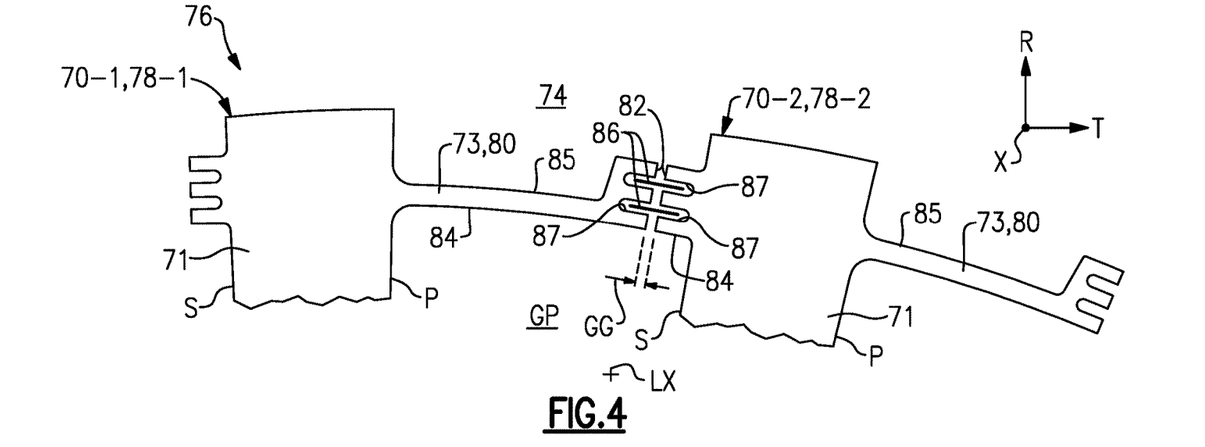
FIG. 4 illustrates an axial view of the assembly of FIG. 3 in a first position.
Figure 5:
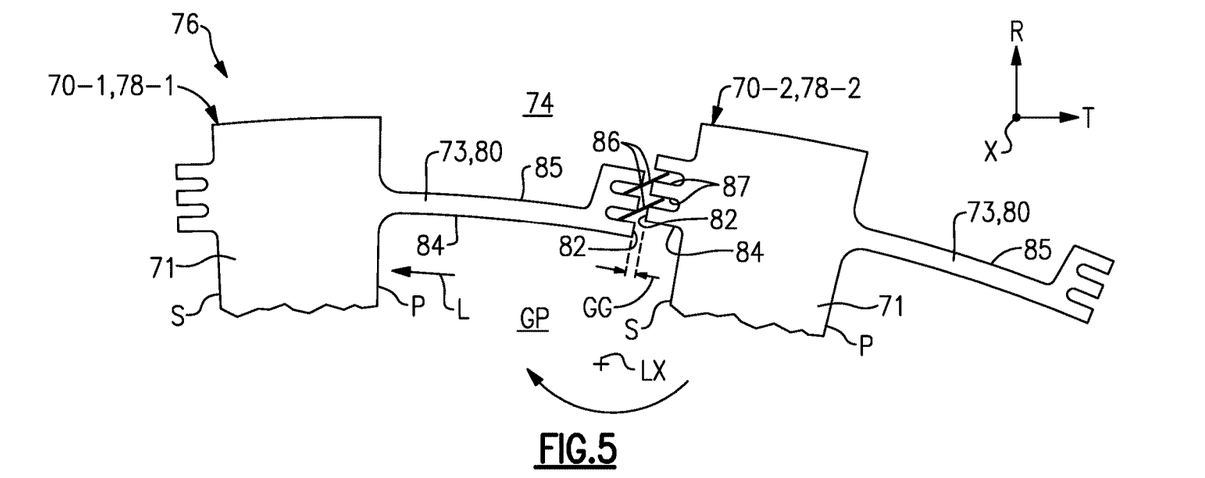
FIG. 5 illustrates an axial view of the assembly of FIG. 3 in a second position.

FIGS. 3-5 illustrate an assembly 76 defining a mate face arrangement according to an example. The assembly 76 can be incorporated into the turbine section 28 of FIGS. 1 and 2 or another portion of the engine 20, for example. The assembly 76 includes an array of components 78 circumferentially distributed about a longitudinal axis LX, which can be collinear with or parallel to the engine axis A (FIGS. 1-2). FIG. 3 illustrates a radial view of adjacent components 78. FIG. 4 illustrates the assembly 76 in a cold assembled (or first assembled) condition or position. FIG. 5 illustrates the assembly 76 in an engine operating (or second assembled) condition or position. In the illustrated example of FIGS. 3-5, the assembly 76 is an airfoil assembly, and components 78 are an array of airfoils such as vanes 70 (indicated as first and second components 78-1, 78-2 and vanes 70-1, 70-2). It should be appreciated that other airfoil and sealing arrangements can benefit from the teachings disclosed herein, including the airfoils 61 and BOAS 69 of FIG. 2.

Each of the vanes 70 includes an airfoil section 71 that extends in a radial direction R from a respective platform or endwall 80. Each of the endwalls 80 can define a respective inner and/or outer platform 72, 73 of the vane 70 (see FIG. 2). Each endwall 80 extends in a chordwise or axial direction X between platform leading and trailing edges 80LE, 80TE (FIG. 3) and extends in a circumferential or thickness direction T between opposed mate faces 82. Each endwall 80 includes a radially facing surface 84 extends between the mate faces 82 to bound at least a portion of gas path GP.

Each airfoil section 71 generally extends in the chordwise direction X between airfoil leading and trailing edges 71LE, 71TE (FIG. 3). Each airfoil section 71 extends in the circumferential direction T between pressure and suction sides P, S. The pressure side P has a generally concave profile or geometry. The suction side S has a generally convex profile or geometry. The radially facing surface 84 is joined with the airfoil section 71. The airfoil section 71 extends outwardly in the radial direction R from the radially facing surface 84. The radially facing surfaces 84 can have a generally arcuate geometry, as illustrated by FIGS. 4 and 5.

The mate faces 82 of adjacent vanes 70 are opposed to define an intersegment (or leakage) gap GG. Each mate face 82 can define one or more retention slot 87 dimensioned to receive a respective seal member 86 (shown in dashed lines in FIG. 3 for illustrative purposes). The retention slot 87 extends inwardly from the mate face 82 and is defined by a thickness of the endwall 80. In the illustrative example of FIGS. 4 and 5, each mate face 82 defines two retention slots 87 that are dimensioned to receive respective seal members 86.

Seal members 86 can be positioned or arranged to span between adjacent mate faces 82 and across the respective intersegment gap GG to at least partially seal the intersegment gap GG. Each seal member 86 can be a feather seal having a generally rectangular geometry that extends substantially between the respective platform leading and trailing edges 80LE, 80TE.

Referring to FIGS. 4 and 5, with continuing reference to FIG. 3, each endwall 80 extends in the radial direction R between the radially facing surface 84 and a cold side surface 85 that is opposed to the radially facing surface 84 of the respective endwall 80. Each of the cold side surfaces 85 bounds one or more cooling plenums 74.

As illustrated in FIGS. 4 and 5, each of the vanes 70 is moveable between the first and second installed positions relative to an adjacent one of the vanes 70. In the first installed position of FIG. 4, the radially facing surfaces 84 of adjacent endwalls 80 are substantially flush or aligned in the radial direction R to provide a boundary of the gas path GP.

Referring to FIG. 5, with continued reference to FIGS. 3 and 4, during engine operation one or more loads L can be exerted on the airfoil section 71. For example, tangential loads L can be exerted from gases communicated in the gas path GP against the pressure side P of the airfoil section 71 (see also FIG. 3). The loads L can cause deflection of the airfoil section 71 and inward bowing of the endwall 80, which can cause at least a portion of the vane 70 to pivot or rotate in the circumferential direction T about the axis LX.

Vane 70-1 is moveable in the circumferential direction T from the first installed position of FIG. 4 to the second installed position relative to adjacent vane 70-2, as illustrated in FIG. 5. Pivoting or rotating of vane 70-1 about the axis LX establishes a step or misalignment along the adjacent mate faces 82. The misalignment or mismatch may cause turbulence along the gas path GP and localized hot spots along the radially facing surfaces 84. Misalignment may also occur due to manufacturing tolerances of the respective components.

Figure 6:
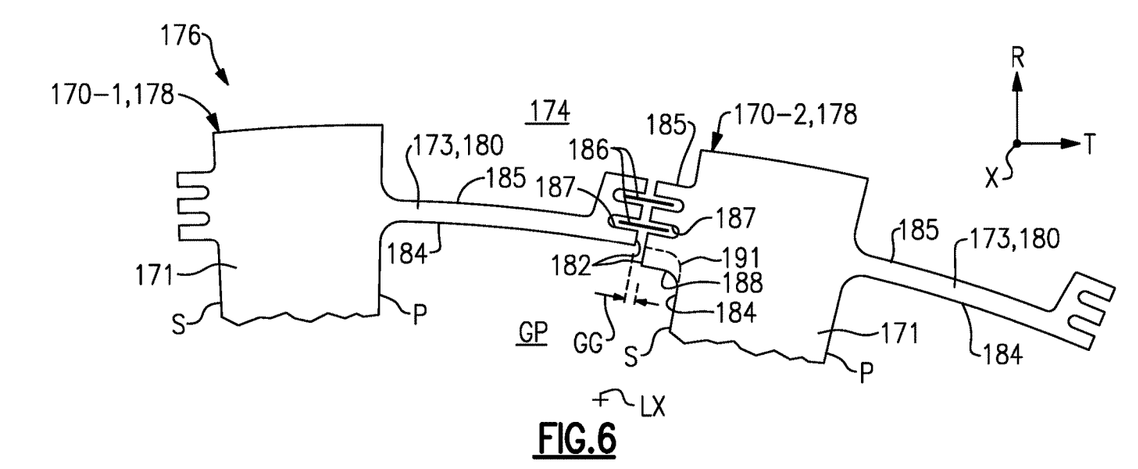
FIG. 6 illustrates an axial view of an assembly including adjacent components in a first position.
Figure 7:
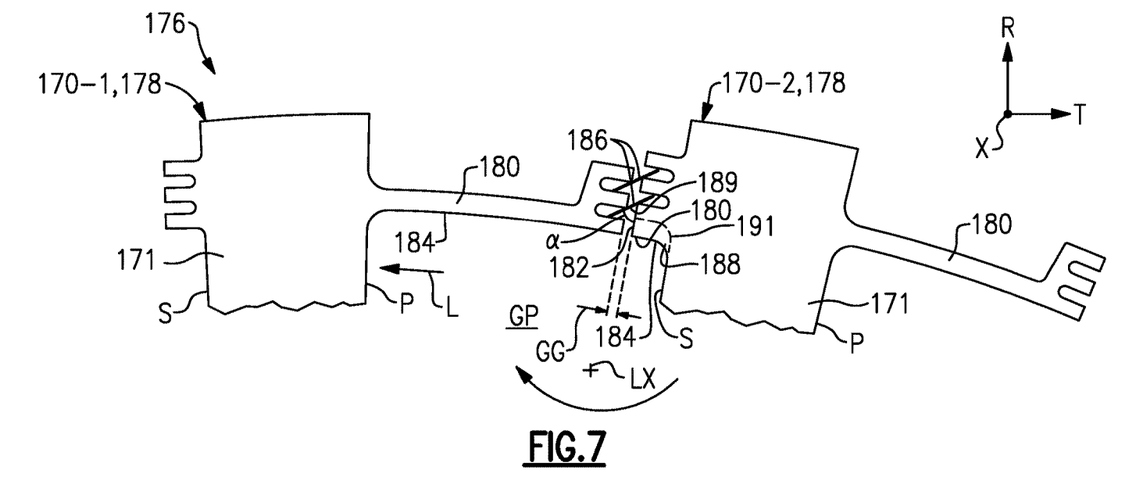
FIG. 7 illustrates an axial view of the assembly of FIG. 6 in a second position.
Figure 8:
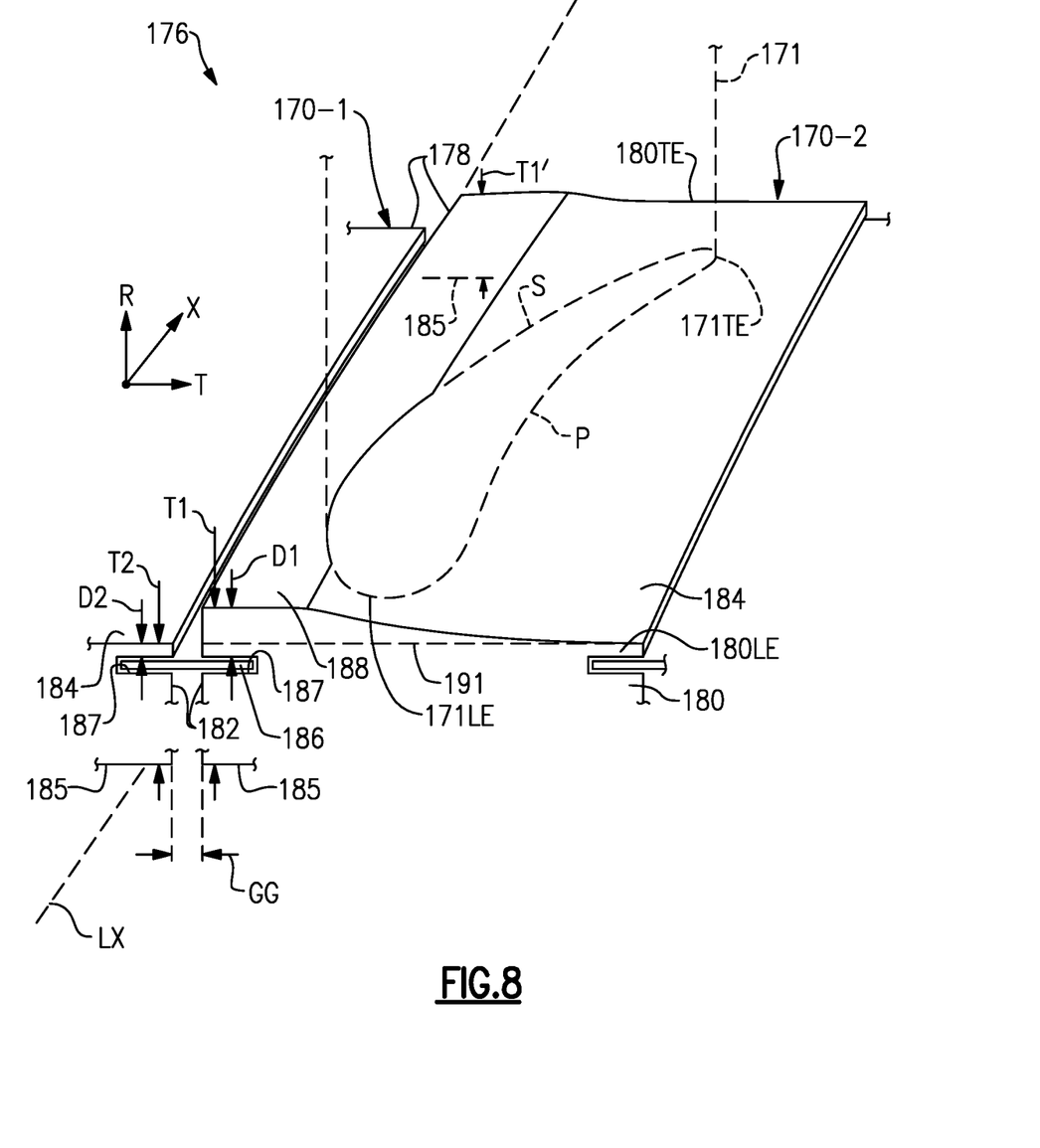
FIG. 8 illustrates a perspective view of adjacent components of the assembly of FIG. 6.

FIGS. 6-8 illustrate an assembly 176 including an array of components 178 defining a mate face arrangement according to another example. In this disclosure, like reference numerals designate like elements where appropriate and reference numerals with the addition of one-hundred or multiples thereof designate modified elements that are understood to incorporate the same features and benefits of the corresponding original elements. In the illustrated examples of FIGS. 6-8, the components 178 include adjacent sets of vanes 170 (indicated at 170-1, 170-2) distributed about a longitudinal axis LX. The vanes 170 can be turbine vanes incorporated into the turbine section 28 of FIGS. 1 and 2, for example. FIGS. 6 and 8 illustrate adjacent vanes 170 in a first installed position. FIG. 7 illustrates adjacent vanes 170 in a second installed position. The first and second installed positions can correspond to cold assembly and engine operating positions or conditions, respectively. As illustrated by FIGS. 6 and 7, vane 170-1 is moveable between the first and second installed positions relative to adjacent vane 170-2.

Each endwall 180 can include one or more features to eliminate or otherwise reduce misalignment of adjacent radially facing surfaces 184 during engine operation. Each endwall 180 includes an elevated portion or section 188 that defines at least a portion of the radially facing surface 184 and adjacent one of the mate faces 182. The elevated section 188 can include additional material that is defined or formed along the respective endwall 180 (boundary 191 shown in dashed lines for illustrative purposes). The vanes 170 can be made of a high temperature metal or alloy, for example. The radially facing surfaces 184 and mate faces 182 can join together at a substantially normal or perpendicular angle, for example. The elevated section 188 can slope from the adjacent mate face 182 towards another one of the mate faces 182, as illustrated by FIG. 8.

In the illustrated example of FIGS. 6-8, the elevated section 188 is defined adjacent to the suction side S of the airfoil section 171. The elevated section 188 is joined with and extends from the suction side S to the respective mate face 182 to define the respective intersegment gap GG. In other examples, the elevated section 188 is defined along the mate face 182 adjacent to the pressure side P of the airfoil section 171.

The elevated section 188 establishes a thickness that differs from other portions of the endwall 180. Referring to FIG. 8, a first thickness T1 is defined between the elevated section 188 of the radially facing surface 184 and the cold side surface 185 adjacent to one of the mate faces 182. A second thickness T2 is defined between the radially facing surface 184 and cold side surface 185 adjacent to another one of the mate faces 182. The elevated section 188 is dimensioned such that the first thickness T1 is greater than the second thickness T2 for at least a majority of a length between the platform leading and trailing edges 180LE, 180TE with respect to the axial direction X, including from at least the airfoil leading edge 171LE to the airfoil trailing edge 171TE (airfoil section 171 shown in dashed lines in FIG. 8 for illustrative purposes).

The elevated section 188 extends in the axial direction X from the platform leading edge 180LE to the platform trailing edge 180TE such that the first thickness T1 is greater than the second thickness T2 for the entire length of the mate face 182. The mate face 182 that corresponds to the second thickness T2 is adjacent to the pressure side P of the airfoil section 171, and the mate face 182 that corresponds to a first thickness T1 is adjacent to the suction side S of the airfoil section 171. The thicknesses T1, T2 can vary between the platform leading and trailing edges 180LE, 180TE. For example, the first thickness T1 at the platform leading edge 180LE can differ from a first thickness T1' at the platform trailing edge 180TE.

The retention slots 187 can be dimensioned relative to the elevated section 188. A first distance D1 is defined in the radial direction R between the radially facing surface 184 along the elevated section 188 and a radially outer face of the retention slot 187 of one of the mate faces 182. A second distance D2 is defined between the radially facing surface 184 and a radially outer face of the retention slot 187 of another one of the mate faces 182. The first and second distances D1, D2 are defined at the same circumferential locations as the thicknesses T1, T2 relative to axis LX. The elevated section 188 is dimensioned such that the first distance D1 is greater than the second distance D2.

As illustrated by FIG. 6, the radially facing surfaces 184 are misaligned in the first position. The radially facing surface 184 of the first vane 170-1 is radially outward of the radially facing surface 184 of the adjacent vane 170-2 with respect to axis LX.

As illustrated by FIG. 7, the radially facing surfaces 184 are substantially flush or radially aligned in the second position in response to pivoting or rotating of the vane 170-1 in the circumferential direction T about axis LX, with the seal member 186 being circumferentially tilted. The seal member 186 includes a seal face 189 that is oriented towards the gas path GP. The seal face 189 defines an acute angle α with the mate face 182 adjacent to the elevated section 188 when the seal member 186 is tilted in the circumferential direction T. Improving alignment of the radially facing surfaces 184 during engine operation can reduce localized hot spots and improve durability of the vanes 170. The techniques disclosed herein can also reduce cooling requirements due to a reduction in hot spots.

Figure 9:
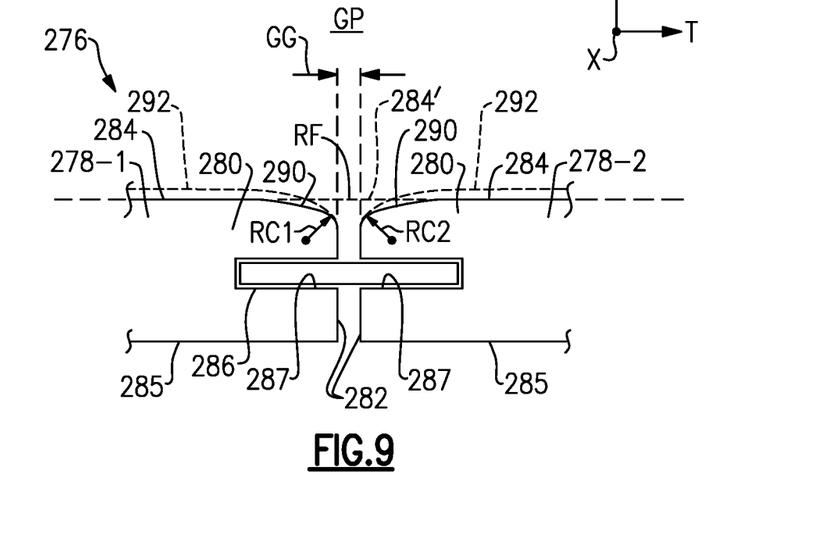
FIG. 9 illustrates an assembly including adjacent components according to another example.

FIG. 9 illustrates an assembly 276 according to another example.

Assembly 276 illustrates adjacent components 278 (indicated at 278-1, 278-2) each having respective mate faces 282 that cooperate to define an intersegment gap GG. Each endwall 280 includes a contour 290 the joins the mate face 282 and adjacent portions of the radially facing surface 284. The contour 290 slopes inwardly from a radially facing surface 284 toward the mate face 282 of the respective component 278-1, 278-2. The contour 290 extends inwardly from a reference plane RF (shown in dashed lines) that is defined along the radially facing surface 284.

The contours 290 can have various geometries. In the illustrative example of FIG. 9, the contours 290 have an arcuate geometry or profile defined by respective radii of curvature RC1, RC2 to establish chamfered edges along the mate faces 282. The radii of curvature RC1, RC2 can be the same or can differ. In some examples, only one of the endwalls 280 includes a contour 290, as illustrated by radially facing surface 284' lacking a respective contour.

Other example contours can include parabolic and compound radii. Forming contours 290 along each of the mate faces 282 can reduce uncertainty in streamlines and radial mismatch. It should be appreciated that the contours disclosed herein can be utilized with any of the mate face arrangements, including the elevated section 188 of FIGS. 6-8. The contours disclosed herein can be established in the component by adding material to the respective die utilized to form the component, for example.

A coating 292 (shown in dashed lines for illustrated purposes) can be disposed on the radially facing surface 284 and/or contour 290. The coating 292 can be a thermal barrier coating (TBC) that thermally insulates the endwall 280 from hot combustion gases in gas path GP.

Figure 10:
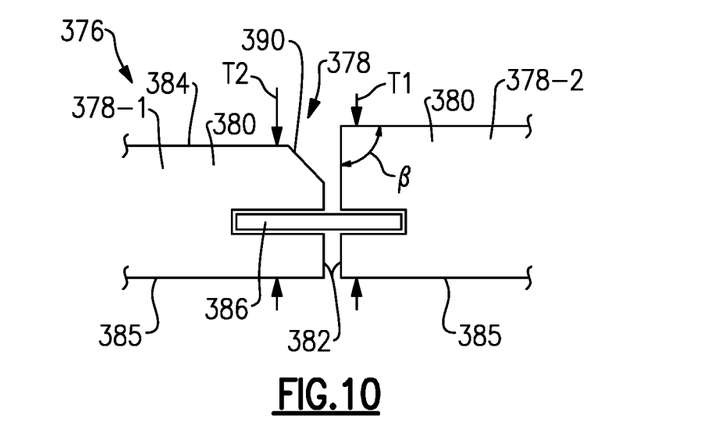
FIG. 10 illustrates an assembly including adjacent components according to yet another example.

In the illustrative example of FIG. 10, contour 390 is a bevel that joins radially facing surface 384 and mate face 382 of component 378-1. Radially facing surface 384 and mate face 382 of component 378-2 join together to define an angle β, which can be substantially normal or perpendicular. A thickness of the endwalls 380 can differ. For example, a first thickness T1 of an endwall 380 of component 378-2 is greater than a second thickness T2 of an endwall 380 of component 378-1.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A component for a gas turbine engine comprising:
   an airfoil section extending in a radial direction from a platform, the airfoil section extending in an axial direction between an airfoil leading edge and an airfoil trailing edge, and the airfoil section extending in the circumferential direction between pressure and suction sides;
   wherein the platform extends in the axial direction between a platform leading edge and a platform trailing edge, and extends in the circumferential direction between a first mate face and a second mate face, wherein the first mate face is adjacent the suction side, and the second mate face is adjacent the pressure side;
   wherein the platform includes a radially facing surface joined with the airfoil section and includes a cold side surface opposed to the radially facing surface; and
   wherein a first thickness is defined between the radially facing surface and the cold side surface adjacent the first mate face, a second thickness is defined between the radially facing surface and the cold side surface adjacent the second mate face, and the first thickness is greater than the second thickness from at least the airfoil leading edge to the airfoil trailing edge with respect to the axial direction.

2. The component as recited in claim 1, wherein the first thickness is greater than second thickness from the platform leading edge to the platform trailing edge.

3. The component as recited in claim 1, wherein the platform includes a contour that slopes inwardly from the radially facing surface toward the second mate face.

4. The component as recited in claim 3, wherein the contour extends in the axial direction from the platform leading edge to the platform trailing edge.

5. The component as recited in claim 3, further comprising at least one coating disposed along the radially facing surface and the contour.

6. The component as recited in claim 1, wherein the first mate face defines a first retention slot, the second mate face defines a second retention slot, and each of the first and second retention slots is dimensioned to receive a respective seal member.

7. The component as recited in claim 1, wherein the component is a turbine vane, and the airfoil section extends between the platform and another platform.

8. A component for a gas turbine engine comprising:
   an airfoil section extending in a radial direction from a platform, the airfoil section extending in an axial direction between an airfoil leading edge and an airfoil trailing edge, and the airfoil section extending in the circumferential direction between pressure and suction sides;
   wherein the platform extends in the axial direction between a platform leading edge and a platform trailing edge, and extends in the circumferential direction between a first mate face and a second mate face;
   wherein the platform includes a radially facing surface joined with the airfoil section and includes a cold side surface opposed to the radially facing surface;
   wherein a first thickness is defined between the radially facing surface and the cold side surface adjacent the first mate face, a second thickness is defined between the radially facing surface and the cold side surface adjacent the second mate face, and the first thickness is greater than the second thickness from at least the airfoil leading edge to the airfoil trailing edge with respect to the axial direction;
   wherein the first mate face defines a first retention slot, the second mate face defines a second retention slot, and each of the first and second retention slots is dimensioned to receive a respective seal member; and
   wherein a first distance is defined in the radial direction between the radially facing surface and the first retention slot adjacent the first mate face, a second distance is defined between the radially facing surface and the second retention slot adjacent the second mate face, and the first distance is greater than second distance.

9. The component as recited in claim 8, wherein the component is a turbine vane, and the airfoil section extends between the platform and another platform.

10. A gas turbine engine comprising:
    first and second components distributed about an engine longitudinal axis;

wherein the first component includes a first endwall extending in an axial direction between a first leading edge and a first trailing edge and extending in a circumferential direction from a first mate face, the first endwall including a first radially facing surface bounding a gas path;

wherein the second component includes a second endwall extending in the axial direction between a second leading edge and a second trailing edge and extending in the circumferential direction from a second mate face, the second endwall including a second radially facing surface bounding the gas path, and the first and second mate faces opposed to define an intersegment gap;

a seal member spanning between the first and second mate faces along the intersegment gap; and wherein the first component is moveable between first and second installed positions relative to the second component, the first and second radially facing surfaces being radially misaligned in the first position, and the first and second radially facing surfaces being radially aligned in the second position in response to pivoting of the first component in the circumferential direction about the engine longitudinal axis.

11. The gas turbine engine as recited in claim 10, wherein the first radially facing surface is radially outward of the second radially facing surface when in the first position.

12. The gas turbine engine as recited in claim 10, wherein the first and second components are first and second vanes, the first vane including a first airfoil section extending in the radial direction from the first endwall, and the second vane including a second airfoil section extending in the radial direction from the second endwall.

13. The gas turbine engine as recited in claim 12, wherein the first and second airfoil sections extend in the circumferential direction between respective pressure and suction sides, the first mate face is adjacent the respective suction side, and the second mate face is adjacent the respective pressure side.

14. The gas turbine engine as recited in claim 10, wherein the seal member is a feather seal received in opposed retention slots defined in the first and second mate faces, and the first and second radially facing surfaces are radially aligned in the second position such that the feather seal is tilted in the circumferential direction.

15. The gas turbine engine as recited in claim 14, wherein the feather seal includes a seal face oriented towards the gas path to define an acute angle with the first mate face when in the second position.

16. The gas turbine engine as recited in claim 10, wherein a first thickness is defined between the first radially facing surface and a first cold side surface of the first endwall adjacent the first mate face, a second thickness is defined between the second radially facing surface and a second cold side surface of the second endwall adjacent the second mate face, and the first thickness is greater than the second thickness for at least a majority of a length between the first leading edge and the first trailing edge.

17. The gas turbine engine as recited in claim 10, wherein:
the first endwall defines a contour that slopes inwardly from the first radially facing surface toward the first mate face; and
the contour extends in the axial direction from the first leading edge to the first trailing edge.

18. A method of assembly for a gas turbine engine comprising:
positioning a feather seal across a leakage gap defined between a first mate face of a first component and a second mate face of a second component adjacent the first mate face, the first component including a first radially facing surface extending from the first mate face, and the second component including a second radially facing surface extending from the second mate face; and
moving the first component between first and second installed positions relative to the second component, the first and second radially facing surfaces being radially misaligned in the first position, and the first and second radially facing surfaces being radially aligned in the second position in response to pivoting of the first component in a circumferential direction.

19. The method as recited in claim 18, wherein a first thickness is defined between the first radially facing surface and a first cold side surface of the first component adjacent the first mate face, a second thickness is defined between the second radially facing surface and a second cold side surface of the second component adjacent the second mate face, and the first thickness is greater than second thickness.

20. The method as recited in claim 18, wherein the first and second components are first and second vanes, the first vane including a first airfoil section extending from the first radially facing surface, and the second vane including a second airfoil section extending from the second radially facing surface.

* * * * *